Patented Jan. 7, 1941

2,228,170

UNITED STATES PATENT OFFICE 2,228,170

INSECTICIDAL AND INSECTIFUGAL COMPOUNDS

Lowell B. Kilgore, Washington, D. C.

No Drawing. Application January 24, 1938,
Serial No. 186,734

5 Claims. (Cl. 167—22)

This invention relates to insect toxic and repellent compounds which are neither offensive nor poisonous to warm blooded animals. The invention includes a series of new synthetic compounds and an admixture of one or more of these compounds with a diluent suitable for their use as an insecticide and insectifuge. Furthermore, by combining one or more of the new compounds described herein with botanical extractives, themselves toxic to a greater or less degree to insects, the insecticidal and insectifugal values of such extractives are enhanced and stabilized.

The compounds specifically included within the scope of the present invention are a species of the class of compounds described and broadly claimed in my United States Patent No. 2,107,298, granted February 8, 1938, the generic formula for which is:

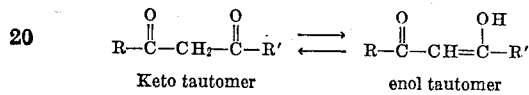

Keto tautomer      enol tautomer the characteristic structure of which formula is a methylene radical positioned between two keto-carbonyl groups wherein R and R' may be the same or different radicals.

Said Patent No. 2,107,298 also describes and claims two species of insect toxic substances under this general class, one species comprising certain beta-diketones, while the other comprises certain alpha, gamma-diketo carboxylic esters, the esters of which contain either an aromatic or a one-carbon-aliphatic group.

In my Patent No. 2,070,603, granted February 16, 1937, still another species is described and claimed under the same generic formula, which species includes a group of delta, epsilon-unsaturated, alpha, gamma-diketo carboxylic esters.

The present application appertains to still another species under the same generic formula, this species answering to the nomenclature of gamma-substituted-alpha, gamma-diketo carboxylic acid esters wherein the gamma substitutions are aralkyl or aliphatic radicals having more than one carbon atom. This species distinguishes from the esters described in my aforementioned Patent No. 2,107,298 in the gamma substitutions, this being aralkyl or aliphatic and containing more than one carbon atom, and it distinguishes from the species described in my Patent No. 2,070,603 in that the esters are not delta, epsilon-unsaturated.

The compounds comprising the species forming the subject of the present invention may be divided into two sub-species, in one of which, herein designated as sub-species A, R is an iso-butyl radical shown in the general formula as follows:

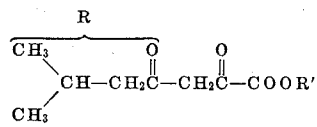

and R'=aliphatic or aralkyl radical giving the corresponding α,γ-diketoisocaprylic acid esters.

The compounds included under this subspecies and which I have tested and found workable for the purpose as herein set forth are:

(CH₃)₂CHCH₂COCH₂COCOOCH₃, α,γ-diketoisocaprylic acid, methyl ester
(CH₃)₂CHCH₂COCH₂COCOOC₂H₅, α,γ-diketoisocaprylic acid, ethyl ester
(CH₃)₂CHCH₂COCH₂COCOOC₄H₉, α,γ-diketoisocaprylic acid, butyl ester
(CH₃)₂CHCH₂COCH₂COCOOCH₂CH(CH₃)₂, α,γ-diketoisocaprylic acid, isobutyl ester
(CH₃)₂CHCH₂COCH₂COCOO(CH₂)₂OC₂H₅, α,γ-diketoisocaprylic acid, 2-ethoxyethylester
(CH₃)₂CHCH₂COCH₂COCOOCH(CH₃)₂, α,γ-diketoisocaprylic acid, isopropyl ester
(CH₃)₂CHCH₂COCH₂COCOOCH₂C(CH₃):CH₂, α,γ-diketoisocaprylic acid, 2-methylallyl ester
(CH₃)₂CHCH₂COCH₂COCOOCH(CH₃)C₃H₇, α,γdiketoisocaprylic acid, 1-methylbutyl ester
(CH₃)₂CHCH₂COCH₂COCOOCH₂CH(C₂H₅)₂, α,γ-diketoisocaprylic acid, 2-ethylbutyl ester
(CH₃)₂CHCH₂COCH₂COCOOC₆H₁₁, α,γ-diketoisocaprylic acid, cyclohexyl ester
(CH₃)₂CHCH₂COCH₂COCOOC₈H₁₇, α,γ-diketoisocaprylic acid, 2-ethylhexyl ester
(CH₃)₂CHCH₂COCH₂COCOOCH₂C₆H₅, α,γ-diketoisocaprylic acid, benzyl ester
(CH₃)₂CHCH₂COCH₂COCOO(CH₂)₃:(CH₃)₂, α,γ-diketoisocaprylic acid, isoamyl ester
(CH₃)₂CHCH₂COCH₂COCOOCH₂CH=CH₂, α,γ-diketoisocaprylic acid, allyl ester Sub-species B includes compounds wherein R' equals the butyl radical as shown in the following formula:

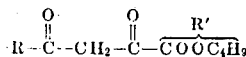

and wherein R may be either aliphatic or aralkyl radicals, these compounds being known as butyl esters of gamma-substituted, alpha, gamma-diketo acids. In sub-species B I have arbitrarily used one ester group and shown in sub-species A, namely the butyl radical and used this group to esterify the various acids of which sub-species B are the esters. Obviously, one ester will therefore be common to both species. This procedure has been followed since the preparation of a large number of these diketo esters would have been required to illustrate all of the combinations of the various acids and the various esterifying radicals. An examination of the compounds comprising these two species shows that any combination of the various acids in sub-species B with various esters group in sub-species A will produce an alpha, gamma-diketo acid ester having insecticidal and insectifugal properties. The compounds under this sub-species which I have tested and found toxic to insects are as follows:

C₂H₅COCH₂COCOOC₄H₉, α,γ-diketocaproic acid, butyl ester
C₃H₇COCH₂COCOOC₄H₉, α,γ-diketoenanthic acid, butyl ester
(CH₃)₂CHCOCH₂COCOOC₄H₉, α,γ-diketoisoenanthic acid, butyl ester
(CH₃)₂CHCH₂COCH₂COCOOC₄H₉, α,γ-diketoisocaprylic acid, butyl ester*
(CH₃)₃CCOCH₂COCOOC₄H₉, α,γ-diketo-δ,δ-dimethylcaproic acid, butyl ester
C₆H₁₁COCH₂COCOOC₄H₉, α,γ-diketopelargonic acid, butyl ester
C₄H₉CH(CH₃)CO—CH₂COCH₂COCOOC₄H₉, α,γ-diketo-δ-methylpelargonic acid, butyl ester
C₆H₁₁COCH₂COCOOC₄H₉, γ-cyclohexyl-α,γ-diketobutyric acid, butyl ester
C₆H₅(CH₃)₂CO—COCH₂COCOOC₄H₉, α-γ-diketo-ε-phenylcaproic acid, butyl ester

*Common to both sub-species.

The α,γ-diketo acid esters which are the subject of this invention may be prepared by the Claisen condensation reaction between the requisite methyl ketone and the respective aliphatic, aralkyl or oxalic ester according to the equation:

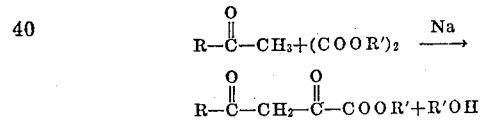

wherein R and R' are aralkyl, or aliphatic radicals.

I have discovered that the alpha, gamma-diketo carboxylic esters which are the subject of this invention possess insecticidal properties not only by themselves, but are also valuable when used in connection with other synthetic and botanical insecticides such as the aliphatic thiocyanates, pyrethrum and rotenone containing botanical extractives. In order to illustrate the insecticidal activity of the above described esters, I selected the following data from my experiments wherein pyrethrum extract is used in conjunction with the said esters and tested by the well known Peet-Grady method. In the particular examples which are tabulated below I have used only sufficient pyrethrum extract in order to effect a more rapid knock-down, the amount being 0.05 gram pyrethrins per 100 cc. which alone gave 40% kill. The added kill shown was effected by the addition of 5 percent by volume of the respective esters to be tested. All tests were run in conjunction with the 1937 official control insecticide of the National Association of Insecticide and Disinfectant Manufacturers. These results so obtained by the Peet-Grady method were then adjusted to the basis of a 50 percent kill for the control insecticide in accordance with the procedure published by J. H. Ford in Soap Magazine, June 1937:

TABLE I

Five percent of the respective α,γ-diketo ester added to a solution of 0.05 gram pyrethrins per 100 cc. of a deodorized kerosene.

| α,γ-diketo ester (5 percent vol.) | Percent kill (24 hours) |
|---|---|
| α,γ-Diketocaproic acid, butyl ester | 75±3 |
| α,γ-Diketoisoenanthic acid, butyl ester | 81±2 |
| α,γ-Diketoenanthic acid, butyl ester | 84±1 |
| α,γ-Diketo-δ,δ-dimethylcaproic acid, butyl ester | 81±2 |
| α,γ-Diketopelargonic acid, butyl ester | 83±2 |
| α,γ-Diketo-δ-methylpelargonic acid, butyl ester | 76±2 |
| α,γ-Diketo-ε-phenylcaproic acid, butyl ester | 75±3 |
| γ-Cyclohexyl-α,γ-diketobutyric acid, butyl ester | 79±2 |
| α,γ-Diketoisocaprylic acid, methyl ester | 73±2 |
| α,γ-Diketoisocaprylic acid, 2-ethoxyethyl ester | 78±1 |
| α,γ-Diketoisocaprylic acid, isopropyl ester | 84.5±1.5 |
| α,γ-Diketoisocaprylic acid, n-butyl ester | 85±1 |
| α,γ-Diketoisocaprylic acid, 2-methylallyl ester | 88±2 |
| α,γ-Diketoisocaprylic acid, isobutyl ester | 86±2.5 |
| α,γ-Diketoisocaprylic acid, 1-methylbutyl ester | 83±2 |
| α,γ-Diketoisocaprylic acid, isoamyl ester | 85±1.5 |
| α,γ-Diketoisocaprylic acid, 2-ethylbutyl ester | 90±1 |
| α,γ-Diketoisocaprylic acid, 2-ethylhexyl ester | 74±2 |
| α,γ-Diketoisocaprylic acid, benzyl ester | 80±2 |
| α,γ-Diketoisocaproic acid, cyclohexyl ester | 89±1.5 |
| α,γ-Diketoisocaproic acid, allyl ester | 90±1.5 |

I have also tested the esters which are the subject of this invention for their insecticidal properties when used in hydrocarbon distillates suitable for liquid insecticides without the addition of any other insecticidal agent, for example, 5 percent of the butyl ester of alpha-gamma-diketo isocaprylic acid (the results of this particular ester were chosen as it is common to both sub-species) at a concentration of 5 percent by volume gave an adjusted kill of 54 percent by the Peet-Grady procedure.

I have found that all of the members of the class of organic compounds described above, namely the aliphatic and aralkyl and esters of gamma-substituted-alpha, gamma-diketo acids, are useful as insect repellents. By incorporating one of these esters in a solution or mixture, strong insectifugal properties are obtained, the magnitude of the effect being proportionate to the amounts of such esters included.

In order to illustrate the insect repellent properties of a solution containing one of these alpha, gamma-diketoacid esters, I have selected the following experiments from my researches wherein I have tested them against house flies using controlled conditions. The test used is the method I choose to call the "sandwich bait" method and is briefly described as follows.

Feeding baits are prepared by coating the central portion of one side of a strip of blotting paper (1.5 x 5 inches) with a smooth thin film of black molasses. These strips are then dried to a hard glassy surface.

Each of the above individual esters were incorporated in solution using various solvents, acetone, alcohol and hydrocarbons at concentrations from one to fifty percent. For example, I have made 50 percent solutions of each of these esters in alcohol. In order to apply these alcoholic solutions to the feeding baits described above, I have immersed thin porous strips of paper of same size as the baits in these solutions, removed and allowed the excess alcohol to evaporate. The treated strips were then superimposed over the baits so as to force the insects attempting to feed to remove the bait through the impregnated cover paper. These sandwich baits were mounted in cages of hungry house flies and the time elapsed before the insects began to feed on each bait was recorded. The relative times of protection against the insects were regarded as representative of the relative repellent values of the various esters used to impregnate the respective bait cover papers.

I have assembled the repellent data shown in Table II from my experiments using 50 percent solutions of the various esters in alcohol wherein the respective durations of the insect repellent effects are shown.

TABLE II

*Insectifugal data*

| α,γ-diketo ester | Duration of repellent effect |
|---|---|
| | Hours |
| α,γ-diketoisocaprylic acid, methyl ester | >5 |
| α,γ-diketoisocaprylic acid, ethyl ester | >5 |
| α,γ-diketoisocaprylic acid, isopropyl ester | >5 |
| α,γ-diketoisocaprylic acid, isobutyl ester | >5 |
| α,γ-diketoisocaprylic acid, butyl ester | 4 |
| α,γ-diketoisocaprylic acid, 1-methylbutyl ester | >5 |
| α,γ-diketoisocaprylic acid, isoamyl ester | >5 |
| α,γ-diketoisocaprylic acid, 2-ethylbutyl ester | >4 |
| α,γ-diketoisocaprylic acid, benzyl ester | ½ |
| α,γ-diketoisocaprylic acid, 2-ethylhexyl ester | 1 |
| α,γ-diketoisocaprylic acid, cyclohexyl ester | 4½ |
| α,γ-diketoisocaprylic acid, 2-ethoxyethyl ester | ¼ |
| α,γ-diketoisocaprylic acid, 2-methylallyl ester | >5 |
| α,γ-diketoisocaprylic acid, allyl ester | 2 |
| α,γ-diketocaproic acid, butyl ester | ½ |
| α,γ-diketoisoenanthic acid, butyl ester | ½ |
| α,γ-diketo-δ,δ-dimethylcaproic acid, butyl ester | 1½ |
| α,γ-diketo-ε-phenylcaproic acid, butyl ester | ¼ |
| α,γ-diketo-δ-methylpelargonic acid, butyl ester | ½ |
| γ-cyclohexyl-α,γ-diketobutyric acid, butyl ester | ½ |
| α,γ-diketopelargonic acid, butyl ester | 1 |

I have selected the following example from my insect repellent tests to illustrate the use of the α,γ-diketo esters which are described herein in a hydrocarbon vehicle such as that used in fly sprays. Four bait strips coated with molasses (supra) were each sprayed at a distance of two feet with 3 cc. of a 5 percent solution of the following esters to be tested for insectifugal properties:

α,γ-diketovaleric acid, butyl ester
α,γ-diketoenanthic acid, butyl ester
α,γ-diketocaprylic acid, ethyl ester
α,γ-diketocaprylic acid, butyl ester The four treated baits were mounted with a control or untreated bait on a card and placed in a cage containing over 1000 hungry flies. The control strip was attacked at once while the flies were repelled from each of the treated strips.

Although I have described this invention with reference to preferred illustrative embodiments thereof and have explained the purposes and preferred mode of operation of invention and the principles thereof, it will now be apparent to those skilled in the art that various specific alterations may be made within the scope of the appended claims.

What I claim is:

1. The group of organic chemical compounds, being species of the generic structural formula:

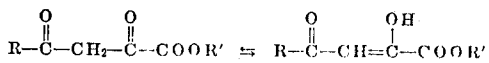

in which R is the isobutyl radical and R' is an aliphatic or aralkyl radical giving the corresponding α,γ-diketoisocaprylic acid esters, useful as insecticides and insectifuges.

2. An insecticide and insectifuge comprising a synthetic ester selected from the group consisting of: α,γ-diketoisocaprylic acid, methyl ester; α,γ-diketoisocaprylic acid, ethyl ester; α,γ-diketoisocaprylic acid, butyl ester; α,γ-diketoisocaprylic acid, isobutyl ester; α,γ-diketoisocaprylic acid, 2-ethoxyethyl ester; α,γ-diketoisocaprylic acid, isopropyl ester; α,γ-diketoisocaprylic acid, 2-methylallyl ester; α,γ-diketoisocaprylic acid, 1-methylbutyl ester; α,γ-diketoisocaprylic acid, 2-ethylbutyl ester; α,γ-diketoisocaprylic acid, cyclohexyl ester; α,γ-diketoisocaprylic acid, 2-ethyl hexyl ester; α,γ-diketoisocaprylic acid, benzyl ester; α,γ-diketoisocaprylic acid, isoamyl ester; α,γ-diketoisocaprylic allyl ester; α,γ-diketocaproic acid, butyl ester; α,γ-diketoenanthic acid, butyl ester; α,γ-diketoisoenanthic acid, butyl ester; α,γ-diketoisocaprylic acid, butyl ester; α,γ-diketo-δ,δ-dimethylcaproic acid, butyl ester; α,γ-diketopelargonic acid, butyl ester; α,γ-diketo-δ-methylpelargonic acid, butyl ester; γ-cyclohexyl-α,γ-diketobutyric acid, butyl ester; α,γ-diketo-ε-phenylcaproic acid, butyl ester.

3. Fortified insecticide and insectifuge comprising a synthetic ester selected from the group consisting of: α,γ-diketoisocaprylic acid, methyl ester; α,γ-diketoisocaprylic acid, ethyl ester; α,γ-diketoisocaprylic acid, butyl ester; α,γ-diketoisocaprylic acid, isobutyl ester; α,γ-diketoisocaprylic acid, 2-ethoxyethyl ester; α,γ-diketoisocaprylic acid, isopropyl ester; α,γ-diketoisocaprylic acid, 2-methylallyl ester; α,γ-diketoisocaprylic acid, 1-methylbutyl ester; α,γ-diketoisocaprylic acid, 2-ethylbutyl ester; α,γ-diketoisocaprylic acid, cyclohexyl ester; α,γ-diketoisocaprylic acid, 2-ethylhexyl ester; α,γ-diketoisocaprylic acid, benzyl ester; α,γ-diketoisocaprylic acid, isoamyl ester; α,γ-diketoisocaprylic acid, allyl ester; α,γ-diketocaproic acid, butyl ester; α,γ-diketoenanthic acid, butyl ester; α,γ-diketoisoenanthic acid, butyl ester; α,γ-diketoisocaprylic acid, butyl ester; α,γ-diketo-δ,δ-dimethylcaproic acid, butyl ester; α,γ-diketopelargenic acid, butyl ester; α,γ-diketo-δ-methylpelargonic acid, butyl ester; γ-cyclohexyl-α,γ-diketobutyric acid, butyl ester; α,γ-diketo-ε-phenylcaproic acid, butyl ester, in combination with insect toxic materials selected from a group consisting of pyrethrum and extractives from rotenone-containing botanicals.

4. The group of organic chemical compounds characterized as γ-substituted-α,γ-diketo carboxylic acid esters wherein the gamma substitutions are from a group consisting of an alkyl group having more than one carbon atom, aralkyl and cycloparaffin groups which esters are useful as insecticides and insectifuges.

5. Fortified insecticide and insectifuge comprising a synthetic ester selected from the group consisting of: α,γ-diketoisocaprylic acid, methyl ester; α,γ-diketoisocaprylic acid, ethyl ester; α,γ-diketoisocaprylic acid, butyl ester; α,γ-diketoisocaprylic acid, isobutyl ester; α,γ-diketoisocaprylic acid, 2-ethoxyethyl ester-α,γ-diketoisocaprylic acid, isopropyl ester-α,γ-diketoisocaprylic acid, 2-methylallyl ester; α,γ-diketoisocaprylic acid, 1-methylbutyl ester; α,γ-diketoisocaprylic acid, 2-ethylbutyl ester; α,γ-diketoisocaprylic acid, cyclohexyl ester; α,γ-diketoisocaprylic acid, 2-ethylhexyl ester; α,γ-diketoisocaprylic acid, benzyl ester-α,γ-diketoisocaprylic acid, isoamyl ester; α,γ-diketoisocaprylic acid, allyl ester; α,γ-diketocaproic acid, butyl ester; α,γ-diketoenanthic acid, butyl ester; α,γ-diketoisoenanthic acid, butyl ester; α,γ-diketoisocaprylic acid, butyl ester; α,γ-diketo-δ,δ-dimethylcaproic acid, butyl ester; α,γ-diketopelargenic acid, butyl ester; α,γ-diketo-δ-methylpelargonic acid, butyl ester; γ-cyclohexyl-α,γ-diketo-butyric acid, butyl ester; α,γ-diketo-ε-phenylcaproic acid, butyl ester, in combination with insect toxic materials comprising aliphatic thiocyanates.

LOWELL B. KILGORE.